(12) United States Patent
Aarhus

(10) Patent No.: US 7,497,022 B1
(45) Date of Patent: Mar. 3, 2009

(54) PLATE LEVEL

(76) Inventor: James Arthur Aarhus, 1462 E. Erie St., Chandler, AZ (US) 85225

( * ) Notice: Subject to any disclaimer, the term of this patent is extended or adjusted under 35 U.S.C. 154(b) by 4 days.

(21) Appl. No.: 11/731,153

(22) Filed: Mar. 31, 2007

Related U.S. Application Data

(60) Provisional application No. 60/789,553, filed on Apr. 4, 2006.

(51) Int. Cl.
*G01C 9/26* (2006.01)

(52) U.S. Cl. .............................. 33/374; 33/376; 33/809

(58) Field of Classification Search .................. 33/374, 33/350, 365, 368, 370, 371, 376, 377, 379, 33/809
See application file for complete search history.

(56) References Cited

U.S. PATENT DOCUMENTS

| | | | | |
|---|---|---|---|---|
| 1,413,056 | A * | 4/1922 | Cooley et al. | ................. 33/374 |
| 3,104,477 | A * | 9/1963 | Edwill | ......................... 33/374 |
| 3,328,887 | A * | 7/1967 | Wright | ......................... 33/372 |
| 3,407,509 | A * | 10/1968 | Martinez | ..................... 33/666 |
| 4,099,331 | A | 7/1978 | Peterson et al. | |
| 4,130,943 | A | 12/1978 | Talbot | |
| 4,152,838 | A | 5/1979 | Cook | |
| 4,435,908 | A | 3/1984 | Selmer | |
| 4,607,437 | A | 8/1986 | McSorley | |
| 4,621,431 | A | 11/1986 | Fatool et al. | |
| 4,733,475 | A | 3/1988 | Youmans | |
| 4,894,925 | A * | 1/1990 | Langmaid | ..................... 33/374 |
| 4,928,395 | A | 5/1990 | Good | |
| 5,155,917 | A | 10/1992 | Townsend | |
| 5,249,365 | A | 10/1993 | Santiago | |
| 5,412,875 | A * | 5/1995 | Hilderbrandt | ................. 33/374 |
| 5,577,327 | A * | 11/1996 | Archambault | ................. 33/374 |
| 5,617,641 | A | 4/1997 | Aarhus | |
| 5,915,810 | A | 6/1999 | Cameron | |
| 6,167,631 | B1 | 1/2001 | Lin | |
| 6,293,023 | B1 * | 9/2001 | Schooley | ..................... 33/374 |
| 6,550,152 | B2 | 4/2003 | Myrick | |
| 6,637,120 | B2 * | 10/2003 | Pustay | ......................... 33/374 |
| 6,915,585 | B2 | 7/2005 | Von Wedemeyer | |

* cited by examiner

*Primary Examiner*—Christopher W Fulton
*Assistant Examiner*—Amy Cohen Johnson

(57) ABSTRACT

An infinitely adjustable level with a least one extender that extends outward from the end of a central body. The level indicating devices can be attached to the extenders, to the central body, or to the extenders and the central body. In this manner the level indicating devices will never be obscured as the extenders are adjusted, no matter what the length of adjustment might be. The infinitely adjustable level provides a method of positioning a level indicating device in a manner such that the level indicating device can be moved to a location for best and most accurate viewing by the operator. The infinitely adjustable level provides a method of locking the central body with the extenders so that relative lateral movement is eliminated.

4 Claims, 5 Drawing Sheets

PLATE LEVEL

CROSS-REFERENCE TO RELATED APPLICATIONS

This application claims the benefit of provisional patent application Ser. No. 60/789,553, filed Apr. 4, 2006.

FEDERALLY SPONSORED RESEARCH

Not Applicable

SEQUENCE LISTING PROGRAM

Not Applicable

BACKGROUND OF THE INVENTION

1. Field of Invention

This invention relates in general to levels that are used in the construction trades and in particular to levels which are used primarily in a vertical position, and are of an adjustable length.

2. Prior Art

In the construction trades, the framed walls of a structure, both interior and exterior, are composed of vertical members commonly called studs, and horizontal or sometimes sloped members commonly called plates. Typically, a wall will have an upper plate and a lower plate with vertically positioned studs fastened between the two plates. In order for the stud wall to be perfectly "plumb", the upper plate must be directly over the lower plate, that is the plates must be in the same plane. The most accurate procedure for the measuring and adjusting the plumbness of the wall is to place a level against the upper and lower plates, adjusting the wall until the level indicates that the wall is perfectly vertical, and then securing the wall in that position. However, studs are usually longer than a conventional level, causing the stud wall to be taller than the length of a conventional level. Therefore, a conventional level is too short to reach from the bottom plate to the top plate. This shortcoming necessitates that the level be positioned against one of the studs of the erect wall, adjusting the wall until the level indicates plumbness of that stud, and then securing the wall in that position. All is fine if the chosen stud is perfectly straight. To those skilled and experienced in the construction trades, it is common knowledge that studs, whether they are of metal or wood, but especially those made of wood, are seldom perfectly straight. The plumbness of the wall then becomes dependent upon the straightness of the studs and placement of the level on the crooked stud.

The present invention provides the solution to the problem of plumbing a stud wall that is composed of crooked studs, by providing a device that can be adjusted to a sufficient length to quickly and accurately span the distance between the upper plate to the lower plate.

In the prior art, various types of adjustable levels are known. For example, U.S. Pat. No. 4,130,943 discloses an adjustable level which is extendible in 6-inch increments. U.S. Pat. No. 4,152,838 discloses a level with a sliding scale. U.S. Pat. No. 4,435,908 discloses an adjustable level with offset members to plumb warped studs. U.S. Pat. No. 4,607,437 discloses an adjustable level with extension legs that are extendible perpendicular to the longitudinal axis of the level. U.S. Pat. No. 4,733,475 discloses an extension level with a spring-loaded member that allows the level to be retained in a wall opening. U.S. Pat. No. 4,928,395 discloses an extensible level in which the extenders are locked in longitudinal tracks on the level. U.S. Pat. No. 5,155,917 discloses a collapsible pocket level. U.S. Pat. No. 5,249,365 discloses a level with telescoping extenders. U.S. Pat. No. 5,617,641 discloses an adjustable length level with no provision for locking the ends in place. However all of the prior art levels suffer from various drawbacks. For example, the level in U.S. Pat. No. 4,130,943 is adjustable only in lengths of fixed increments. If the user wants a level of a length somewhere in between the fixed increments, the level is incapable of obtaining such a length. U.S. Pat. No. 5,617,641 discloses an adjustable length level with no provision for locking the ends pieces in place. U.S. Pat. No. 6,915,585 discloses a spirit level which can extend in length, but has a very limited range of less than twice its original length.

SUMMARY OF THE INVENTION

The first embodiment of the present invention provides an infinitely adjustable length level with a pair of extenders, which extend out from opposite ends of the main body. The second embodiment of the present invention provides an infinitely adjustable length level with one extender, which extends out from only one end of the main body. The present invention is to be primarily used in the construction trades to accurately plumb stud walls, and is typically used between the top plate and the bottom plate of a wall. The present invention also provides a method of levelling across a distance that would not normally be able to be bridged with conventional fixed length levels.

It is an object of the present invention to provide an adjustable level, which can be adjusted to any length.

It is an object of the present invention to provide an adjustable level, which can be adjusted in length without obscuring the level vials.

It is an object of the present invention to provide an adjustable level, which can be adjusted in length to fit within an opening that does not provide space for the level to overhang the opening.

It is an object of the present invention to provide an adjustable level, which can be adjusted in length, and when in the extended position, the vials will be stable against relative movement.

It is an object of the present invention to provide an adjustable level, which provides a method of positioning an indicating device to a variable position for best viewing.

It is an object of the present invention to provide an adjustable level, incorporating suitable locking devices, so as to prevent collapse when in a vertical position.

Figure 1:
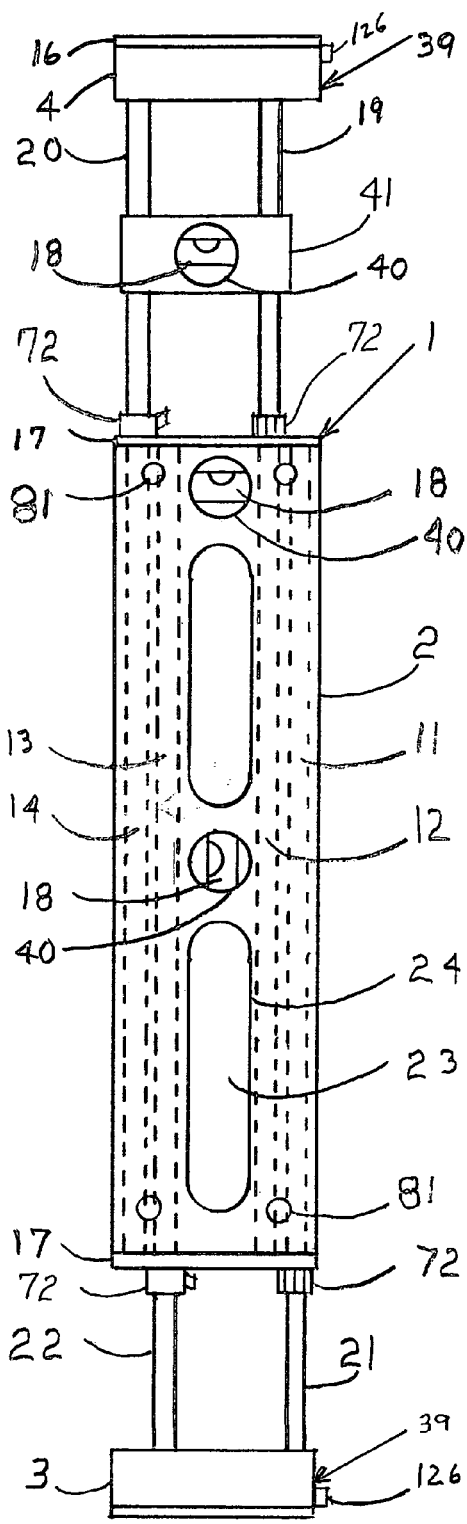
FIG. 1 is an elevation view showing a first embodiment of the present invention.

| Drawings--Reference Numerals | |
|---|---|
| 1. | Present Invention |
| 2. | Main Body |
| 3. | End Piece |
| 4. | End Piece |
| 11. | Shaft |
| 12. | Shaft |
| 13. | Shaft |
| 14. | Shaft |
| 16. | End Cap |
| 17. | End Cap |
| 18. | Level Indicating Device |
| 19. | Rod |
| 20. | Rod |
| 21. | Rod |
| 22. | Rod |
| 23. | Hand Hold |
| 24. | Cutout |
| 39. | Extender |
| 40. | Cutout |
| 41. | Indicating Device Assembly |
| 61. | Stop Member |
| 62. | Stop Member |
| 71. | Stop Member |
| 72. | Locking Assembly |
| 81. | Cam Lever Lock |
| 82. | Thumb Bolt |
| 83. | Bushing |
| 84. | Center Web |
| 91. | Channel |
| 92. | Rectangular Shaft |
| 110. | Extender |
| 111. | Shaft |
| 112. | Shaft |
| 113. | End Piece |
| 114. | End Cap |
| 115. | Center Web |
| 116. | Rectangular Shaft |
| 118. | Telescopic Tube Assembly |
| 119. | Handhold |
| 120. | End Cap |
| 121. | Clutch Lock |
| 122. | Snap Lock |
| 123. | Telescopic Tube |
| 124. | Telescopic Tube |
| 125. | Telescopic Tube |
| 126. | Offset |

DETAILED DESCRIPTION

First Embodiment

Figure 2:
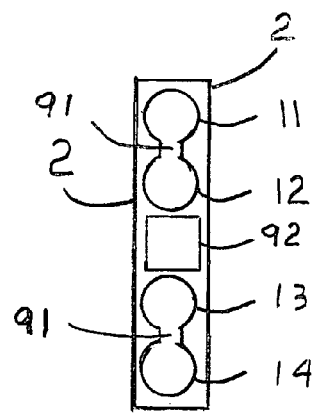
FIG. 2 is a bottom view of the main body of the present invention in FIG. 1.
Figure 3:
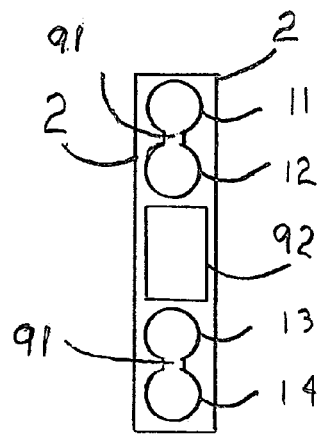
FIG. 3 is a top view of the main body of the present invention in FIG. 1.

Referring now in greater detail to the drawings, FIG. 1 shows an elevation view of the first embodiment of the present invention. The level has a main body 2 with four circular shafts 11, 12, 13, and 14 extending all the way through the main body. The circular shafts are arranged in the same plane and are parallel to each other, as can be seen in FIG. 2 and FIG. 3.

The circular shafts (hereafter called shafts) are dimensioned to receive rods 19, 20, 21 and 22 with a close tolerance fit. This will allow the rods to slide within the shafts. Attached to the rods are end pieces 3 and 4. As shown in FIG. 1, rods 21 and 22 would typically be attached to end piece 3, and rods 19 and 20 would typically be attached to end piece 4. The combination of an end piece (for example 3) and a pair of attached rods (for example 21 and 22) is called an extender 39. The rods 19, 20, 21, and 22 are of a length that is slightly shorter than the longitudinal dimension of the main body 2. When the extenders 39 are pushed all the way toward the main body 2, the end pieces 3 and 4, will abut the ends of the main body 2. The length of the rods will allow each extender 39 to extend outward from the main body 2 to nearly the length of the main body so that when fully extended the level will be nearly three times longer than it was in a closed position. There will be no visibility restriction as to the usefulness of any leveling device in any positioning of the extenders 39.

Appropriately spaced cut outs 24 for handholds 23, can be seen in FIG. 1. In FIG. 1, protective end caps 16 are depicted, which are made of impact absorbing, shock resistant material such as plastic, rubber, or other dampening and protective material. The protective end caps 16 are affixed to the outside end surface of the end pieces 3 and 4 and will protect the end pieces 3 and 4 from damage due to dropping or from normal wear and tear. In FIG. 1, protective caps 17, also made of impact absorbing, shock resistant material such as plastic, rubber, or other dampening and protective material, are depicted. The protective caps 17 are affixed to the outside ends of the main body 2, and can be dimensioned to fit snugly around the penetrating rods 19, 20, 21, and 22, thereby creating an air dampening effect when the extenders 39 are moved in the main body 2, as the ends of the shafts 11, 12, 13, and 14 and channels 91 are blocked when the protective caps 17 are in their correct position. The protective caps 17 will prevent dust and construction debris from entering the shafts 11, 12, 13, and 14, and channels 91, and thereby protect the interior surfaces of the main body 2 from undue damage from dust and debris during use of the level.

Shown in FIG. 1 are circular cut outs 40, which can be properly positioned for the attachment of plumb and level indicating devices 18. The plumb and level indicating devices 18 may be a conventional spirit vial with attached method of holding same, an electronic sensor which will indicate "level" with attached method of holding same, or any similar purpose level indicating device. It should be noted that well known level and plumb indicating devices 18, hereafter called "indicating devices", such as spirit vial assemblies, electronic level indicating devices, or similar purpose devices, may be attached to the present invention in a variety of ways, dependent upon the embodiment of the main body 2, and in any desirable combination with each other. Those knowledgeable of the use of levels will recognize that the terminology of "level" and "plumb" relate to the orientation of a level to the horizontal or vertical placement of the level and those terminologies will be used interchangeably in this context. The indicating devices 18 can be attached to one or both of the extenders 39, only to the main body 2, or to both the extenders 39 and the main body 2. In this manner the indicating devices 18 will never be obscured as the extenders 39 are adjusted, no matter what the length of adjustment might be.

Figure 4:
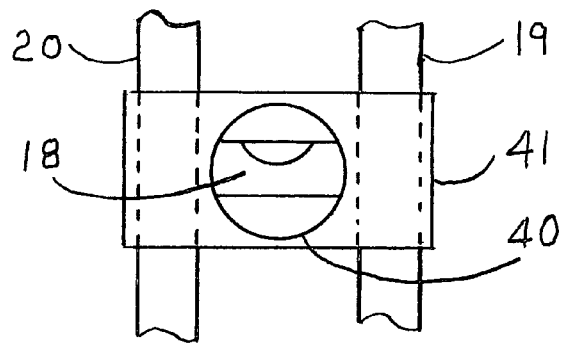
FIG. 4 is an elevation view of a level indicating assembly of the present invention of FIG. 1.

An indicating device assembly 41 is shown in FIG. 1, and in FIG. 4. The indicating device assembly 41 is comprised of an indicting device 18, and an appropriate apparatus made of a material such as metal or plastic, to house the indicating device 18. Indicating device assembly 41 is constructed so as to be movable on a pair of rods, such as 19 and 20, and can therefore be adjusted to a desirable position for best viewing of the incorporated indicating device 18 in various orientations of the present invention. Assembly 41 can be affixed to one or both of the extenders. Assembly 41 has a cut out 40 into which an appropriately sized indicating device 18 is affixed. Assembly 41 will be held in the desired position accurately and securely by friction between the parts, or by some similar fastener such as, but not limited to, a ball indent device or thumb screw. Assembly 41 also stabilizes the extenders 39, by keeping the rods, for example 19 and 20, spaced equally apart when sideways torque is applied to the extenders 39, when the level is in contact with the plates of a wall section.

FIG. 2 and FIG. 3 are top and bottom views respectively of the main body 2, and depict the relative positions of the shafts 11, 12, 13, 14, and 92. Shafts 11, 12, 13, 14, and 92 are arranged in a vertical plane and parallel to each other. Shafts 11, 12, 13, 14, and 92 extend the full length of the main body 2.

Figure 5:
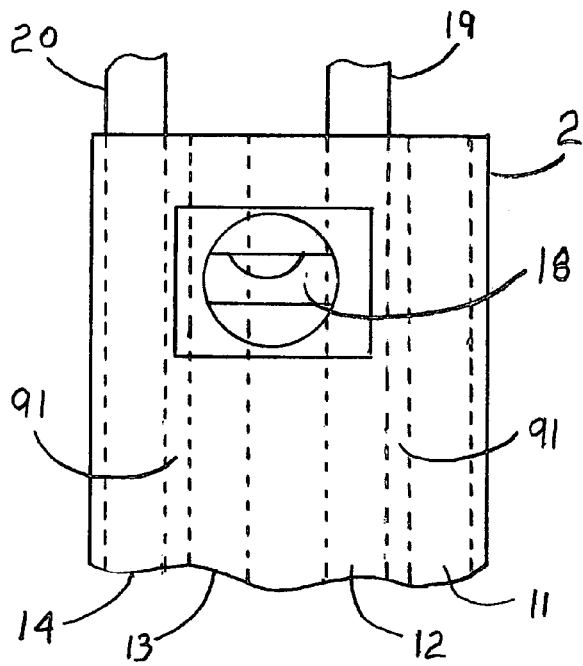
FIG. 5 is an elevation view of an embodiment of a level indicating device of the present invention of FIG. 1.
Figure 8:
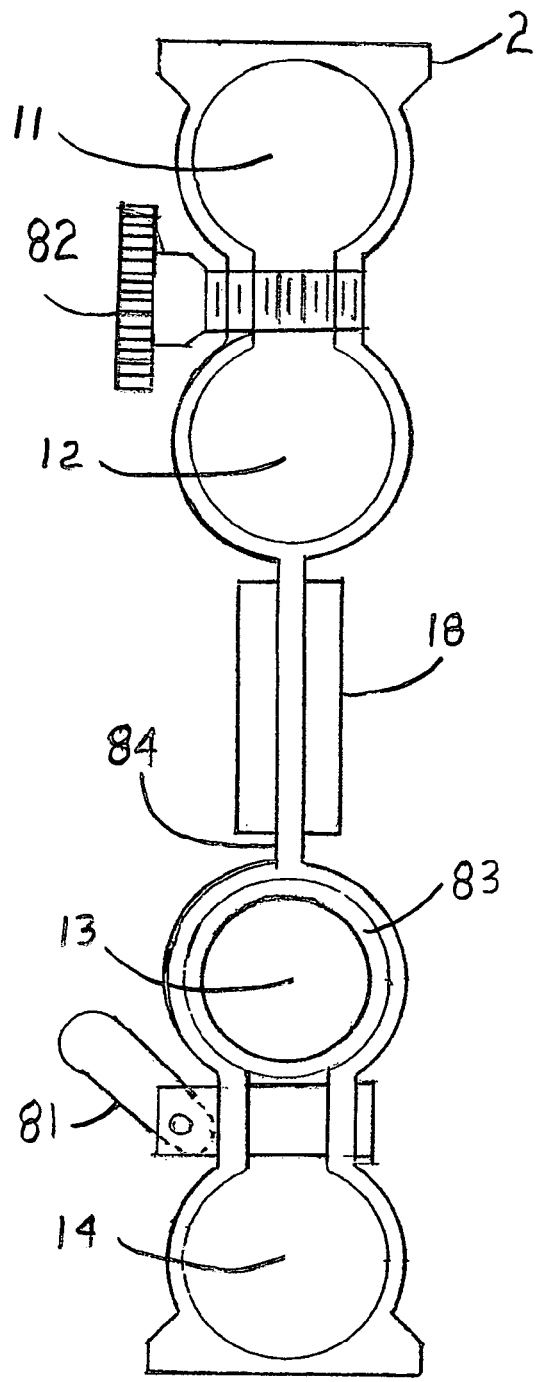
FIG. 8 is an end view of a first embodiment of the main body of the present invention in FIG. 1.
Figure 9:
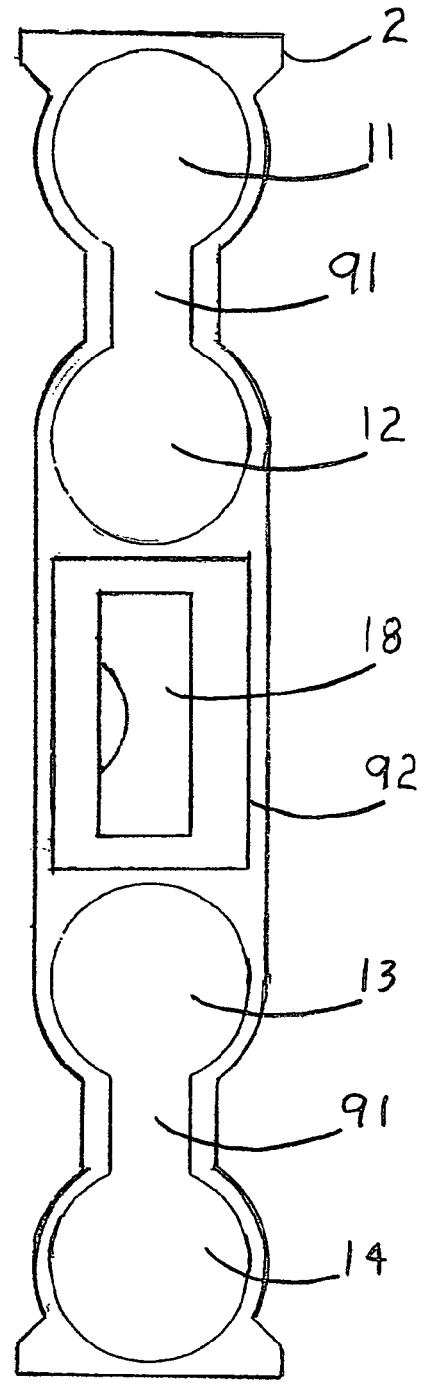
FIG. 9 is an end view of a second embodiment of the main body of the present invention in FIG. 1.

Indicating devices 18 can be attached to the main body 2 of the present invention in several manners, depending on the embodiment of the main body 2. FIG. 5 depicts a first method of the attachment of the indicating device 18 to the outside flat surface of an embodiment of the main body 2. A second method of the attachment of the indicating device 18 is depicted in FIG. 8 whereby the indicating device 18 is attached to the center web 84 of the second embodiment of the main body 2. A third method of attachment of the indicating device 18 is depicted in FIG. 9 whereby the indicating device 18 is inserted into the rectangular shaped shaft 92 of the third embodiment of the main body 2.

Figure 6:
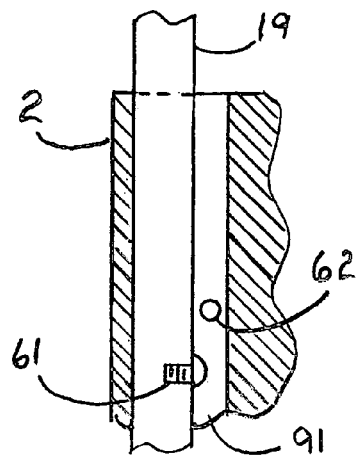
FIG. 6 is a partial view of an embodiment of a stop method for rods of the present invention.
Figure 7:
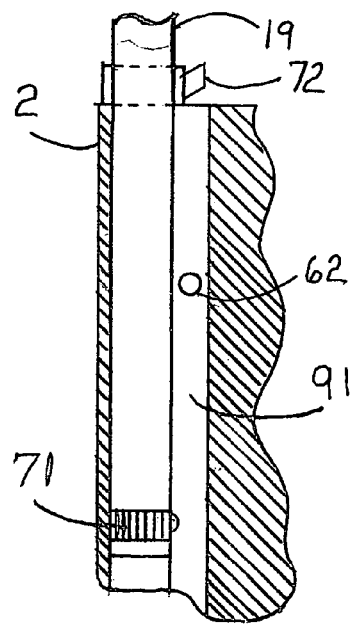
FIG. 7 is a partial view of a second embodiment of a stop method for rods of the present invention.

FIG. 6 and FIG. 7 depict two embodiments of a method of preventing the separation of the extenders 39 from the main body. As shown in FIG. 6, (first embodiment) at least one of the rods, or all of the rods 19, 20, 21 and 22 can have a stop member such as a bolt 61. Stop member 61 will engage a second stop member 62 secured in the channel 91, thereby preventing the unintentional separation of the extenders 39 from the main body 2. As shown in FIG. 7, (second embodiment) a stop member 71 is attached to rod 19. Stop member 71 will engage a second stop member 62 secured in the channel 91 thus preventing the unintentional separation of the extenders 39 from the main body 2. Stop member 71 shall be a plug made of nylon or similar material that will contact the interior surface of the shafts 11, 12, 13, and 14 in such a way as to separate the rods 19, 20, 21, and 22 from the shafts 11, 12, 13, and 14 and thus prevent undue wear or friction of the shafts and rods. Stop member 71 may have a spring installed so as to exert pressure on the nylon or similar material plug thereby exerting pressure against the shaft (11, 12, 13, or 14) wall, thereby stabilizing the rods against relative movement.

FIG. 8 is a detailed end view of a second embodiment of the main body 2, in which center web 84 extends between the shaft 12 and the shaft 13. Center web 84 is provided as a position for the attachment of an indicating device 18 on the second embodiment of the main body 2. FIG. 9 is a detailed end view of a third embodiment of the main body 2 in which a rectangular shaped shaft 92 extends between the shaft 12 and the shaft 13. Rectangular shaped shaft 92 is provided as a position for the placement of an indicating device 18 on the second embodiment of the main body 2. Channel 91 is provided between the shafts 11 and 12, and between shafts 13 and 14, as shown in FIG. 9. When compressing force is applied to the channel 91, by the locking devices 81 or 82, this open channel 91 will be compressed, thereby locking rods 19, 20, 21, and 22 against the interior surface of the shafts 11, 12, 13, and 14. Channel 91 runs the full length of the main body 2.

As can be seen in FIG. 8, two embodiments of locking devices are shown that can be used to apply force to the main body 2 in such a way as to decrease the diameter of shafts 11 and 12 and shafts 13 and 14. In the first embodiment, the locking device is a cam lever lock 81 and it is used to apply pressure to the main body 2 thereby compressing the main body in the area of channel 91, which will pinch the shafts 11 and 12 and firmly secure rods 19 and 21 when the rods are positioned in the shafts. Also in FIG. 8, a second embodiment of a locking device, thumb bolt 82 is used to apply pressure to the main body and thereby compress the main body in the area of 91, which will pinch the shafts 13 and 14 and firmly secure rods (for example 20 and 22) when the rods are properly positioned in the shafts.

An alternative method of locking the rods in place is shown in FIG. 1 and FIG. 7. A locking assembly 72 such as a clutch lock, a lever lock, a cam lock, a snap lock or any other commonly used locking device, which are well known and commonly used in telescopic tube assemblies, such as camera tripods and surveying tripods, can be affixed to the main body 2, and tightened against the rods 19, 20, 21, and 22 to hold them in the desired position. Using this method, the locking devices 81 and 82 are eliminated.

The shafts can have bushings placed inside to help hold the rods in whatever position they are placed. While only one bushing 83 is shown in the FIG. 8, it should be understood that bushing 83 might be placed in any or all of the shafts 11, 12, 13, and 14. Bushing 83 or multiple bushings 83 can be used to renew the friction fit between the rods and the shafts as they wear from use, and provide a protective bearing surface between the shafts and the rods. The bushings 83, can be split or continuous bushings, and can be made from any material such as, but not limited to, metal, nylon or plastic. Offsets 126 are shown, and are used to bridge around bowed studs.

Operation

First Embodiment

When the present invention is in use, the locking devices, such as thumb bolt 82, are unlocked, the extenders 39 are extended away from the main body the chosen distance, and the locking device, such as thumb bolt 82 is tightened so as to hold the rods immobile to linear movement and firmly mating the rods to the main body 2. Upon loosening the thumb bolt 82, the operator is able to again adjust the extender 39 to the desired length. Retightening the thumb bolt 82 will cause the extender 39 to be held securely in desired position, therefore establishing a rigid level of the chosen length. When the extender 39 is moved to the chosen length for the application, the indicator device assembly 41 is moved by the operator to a position for the best viewing of the level indicator device assembly 41.

Description

Alternative Embodiment

Figure 10:
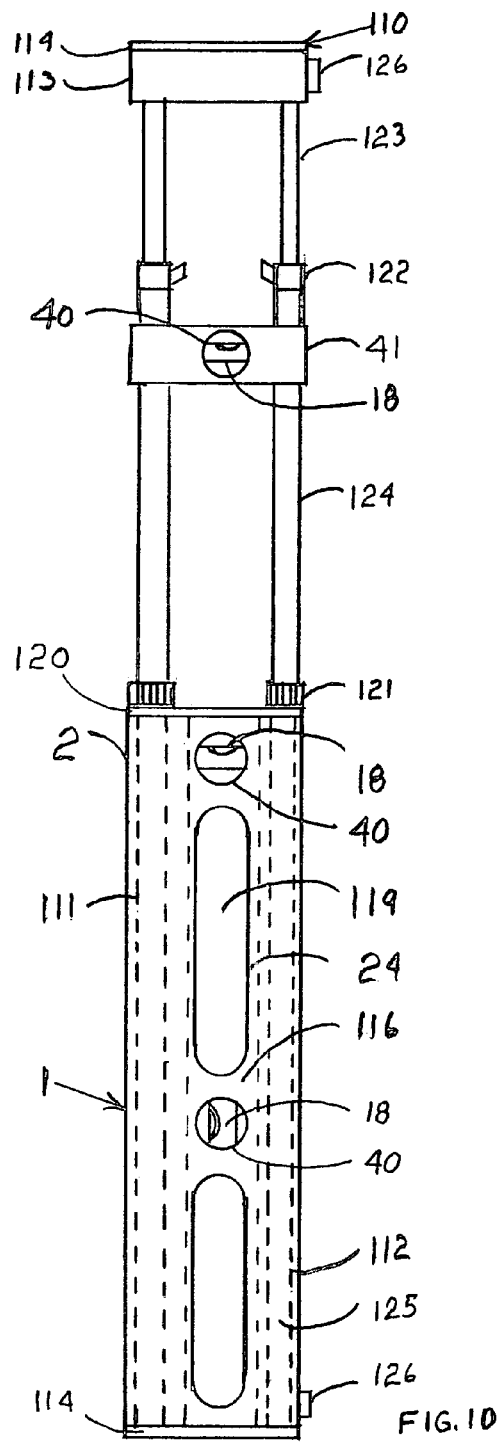
FIG. 10 is an elevation view showing a second embodiment of the present invention.

FIG. 10 shows an elevation view of a second embodiment of the present invention. The present invention has a main body 2 with two shafts 111 and 112 that extend the full length of the main body 2. A rectangular shaped shaft 116 also extends the full length of the main body 2. A telescopic tube assembly 118, consisting of one or more sections of tubing (123, 124, and 125) is shown in FIG. 10 and a more detailed view in FIG. 11.

Circular cut outs 40 are shown in FIG. 10, and can be properly positioned for the attachment of indicating devices 18. Indicating devices 18 can be attached to the extender 110, to the main body 2, or to both the extender 110 and the main body 2. In this manner the indicating devices 18 will never be obscured as the extender 110 is adjusted, no matter what the length of adjustment might be.

Indicator device assembly 41 is shown in FIG. 10. Indicator device assembly 41 is constructed so as to be movable on the appropriately selected tubes of the telescopic tube assemblies 118. When the present invention is in use, the indicator device assembly 41 is adjusted to a desirable position for best viewing of the incorporated indicating device 18 in various orientations of the present invention. The indicator device assembly 41 will be held in the desired position accurately and mechanically by friction between the parts or by some similar purpose device such as a ball detent. The indicator device assembly 41 also serves to stabilize the telescopic tube assemblies 118 when the tubes are extended, by keeping the rods, for example 124, spaced equally apart when sideways torque is applied to the extenders 110, when the level is in contact with the plates of a wall section.

Appropriately spaced cut outs 24 for handholds 119, can be seen in FIG. 10. In FIG. 10, protective end caps 114 are depicted, which are made of impact absorbing, shock resistant material such as plastic or other similar dampening and protective material. Protective end caps 114 are affixed to the outside end surface of the end piece 113 and to the outer end of main body 2 and will protect the end piece 113 and main body 2 from damage due to dropping or normal wear and tear. A protective cap 120, also made of plastic or other dampening and protective material, is depicted. Protective cap 120 is affixed to the inside end of the main body 2, and can be dimensioned to fit snugly around the penetrating tubes of the telescoping assemblies 118, thereby creating an air dampening effect when the extender 110 is moved into the main body 2, as the ends of the shafts 111 and 112 are blocked when the protective end caps 114 and 120 are in correct position. Protective end caps 114 and 120 will prevent dust and construction debris from entering the shafts 111 and 112 and rectangular shaped shaft 116, and thereby protect the interior surfaces of the main body 2 from undue damage from dust and debris during use of the level. Magnetic or non-magnetic offsets 126 are installed on the main body 2 and the extender 110 so that the level can bridge across studs that are bowed.

Figure 11:
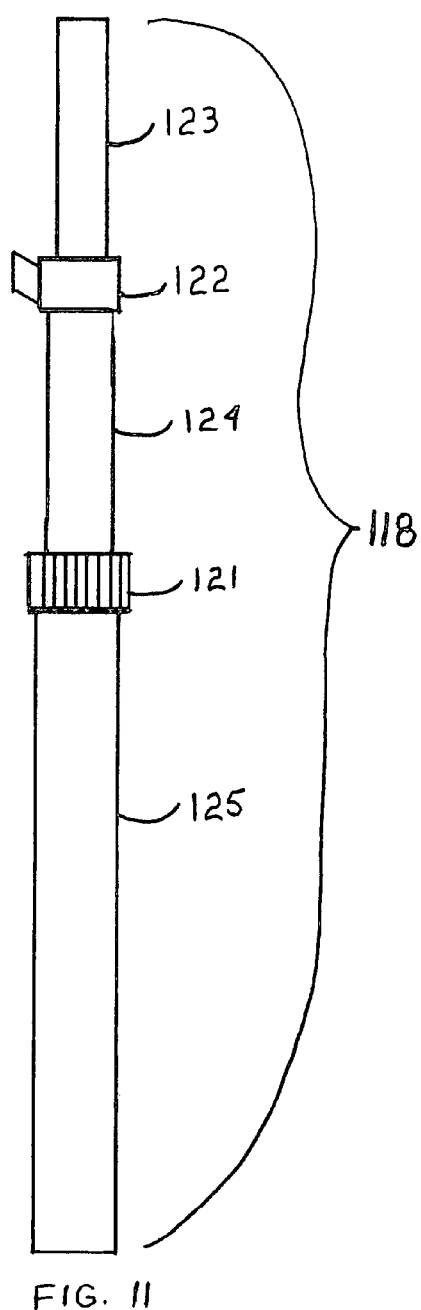
FIG. 11 is a view of a telescopic tube assembly.

FIG. 11 is a more detailed view of the telescopic tube assembly 118. It is well known in the area of general knowledge that many well established techniques and designs are employed in the manufacture, assembly, and method of securing the sections of tubing in telescopic tube assemblies 118. Each telescopic tube assembly 118 consists of one or more sections of tubing (such as 123, 124, and 125). Various types well known locks are used to secure the tubes to each other such as a "clutch lock" 121 and "snap lock" 122. As the sections of tubing are pushed together, the telescopic tube assembly 118 becomes shorter. As the sections of tubing are extended, the telescopic tube assembly 118 becomes longer.

Each shaft (111 and 112) is dimensioned to receive, with close tolerance fit, a telescopic tube assembly 118. The largest end of each telescopic tube assembly 118 is inserted into the shaft 111 and into the shaft 112 and the telescopic assemblies 118 are secured in place in the shaft 111 and the shaft 112. The smallest or outward end of each telescoping assembly 118 is attached to end piece 113. End piece 113 ties together the outward ends of the telescopic assembly 118 and gives stability as the extender 110 is advanced outward. The tying together of the telescoping tube assembly 118, with the end piece 113, in combination with the extender 110 being locked to the main body 2, in combination with the indicating device assembly 41 placed midway on the tubes 124, causes the present invention to be extremely stable against relative sideways torque. The resulting extended present invention, takes on the characteristics of a trussed device because of the multiplicity of supporting contact points between the telescoping tubes 124, the end piece 113, and the main body 2. The combination of end piece 113 and a pair of attached telescoping assemblies 118 is called the extender 110. When the extender 110 is pushed all the way toward the main body 2, the present invention is at its minimum length. When the extender 110 is fully extended outward from the main body 2, the present invention is at its maximum length. With an appropriately sized multi-section telescopic tube assembly 118 in place, the present invention will extend to nearly three times its minimum length.

Figure 12:
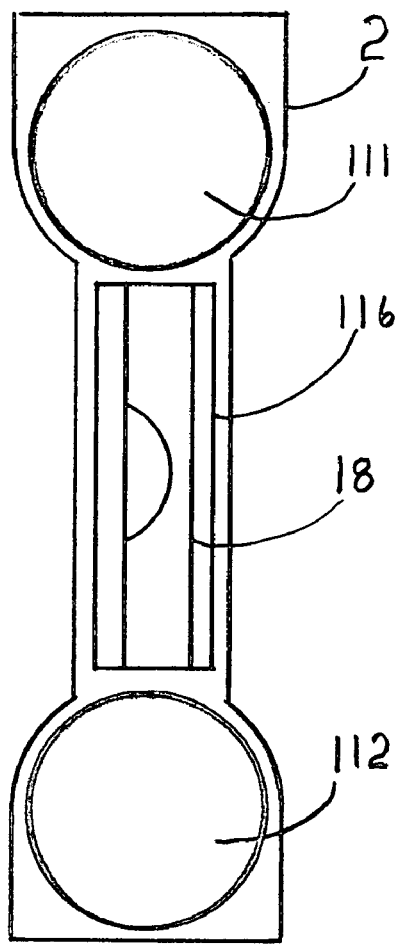
FIG. 12 is an end view of a first embodiment of the main body of the second embodiment of present invention in FIG. 10.

FIG. 12 is an end view of an embodiment of the main body 2 of the present invention depicted in FIG. 10 which shows the indicating device 18, the relative positions of shafts 111 and 112, and the rectangular shaped shaft 116 that extends between the shaft 111 and the shaft 112.

Figure 13:
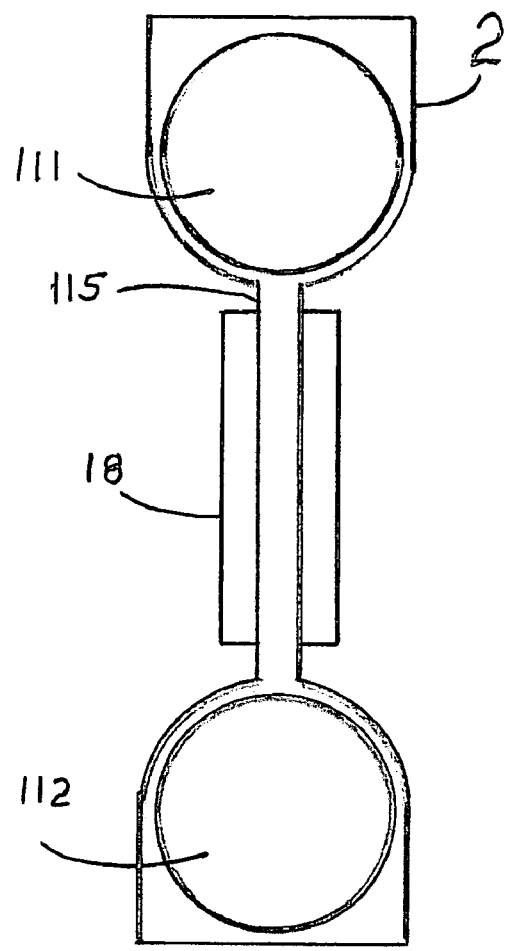
FIG. 13 is an end view of a second embodiment of the main body of the second embodiment of present invention in FIG. 10.

FIG. 13 is an end view of a second embodiment of the main body 2 of the present invention depicted in FIG. 10, which shows the indicating device 18, the relative positions of shafts 111 and 112, and the center web 115, which extends between the shaft 111 and the shaft 112.

The indicating device 18 can be attached to the main body 2 in several manners, depending on the embodiment of the main body 2. A first method of attachment of the indicating device 18 is depicted in FIG. 12 (also FIG. 9) whereby the indicating device 18 is inserted into the rectangular shaped shaft 116 of the main body 2. Present invention using this style of main body 2 is called a "Box Beam" level because of the box shaped shaft in the center of the main body 2. A second method of the attachment of the indicating device 18 is depicted in FIG. 13 (also FIG. 8) whereby the indicating device 18 is securely affixed to the center web 115 of the main body 2. Present invention using this style of main body 2 is called an "I-Beam" level because cross section of the main body 2 resembles an I-beam commonly used in the construction trades.

Operation

Alternative Embodiment

The present invention is designed to be telescopic, such that a desired length is available to accomplish a particular need. The most commonly used orientation for this embodiment, is in a vertical position. As such, the main body will always remain in contact with the floor or ground upon which the level is positioned. This leads to great stability of the invention because the majority of the weight of the level is therefore close to the ground. In use, the appropriate locking devices, 121 or 122, are loosened, the extender 110 moved to the chosen position, and the locking devices activated so as to securely and accurately mate the main body 2, with the extender 110 members. The extended length of the present invention can be quickly and accurately changed by simply unlocking the appropriate locking devices, adjusting the extender 110 to the desired position, and relocking the appropriate locking devices. When the level is of the chosen length, the indicating device assembly 41 is adjusted for best viewing of the level indicating device 18. The usefulness of the feature of being able to move the indicating device assembly 41 to a position of best viewing is of particular value to the operator, as the operator is able to adjust the indicating device assembly 41 to position of looking up, rather than down when operating the present invention. Usually a companion is at the top of the stud wall in order to fasten it into position when plumbness is achieved. For the operator to be looking downward to read the indicating device 18, when his companion is upward, leads to inaccuracies and communication difficulties on a noisy job site.

Should the need arise, moving the indicating device assembly 41 to an approximate midpoint on the telescopic tube 124, results in the extender 110 becoming more rigid by holding the telescopic tubes 124 equally apart and unable to move toward each other when sideways torque is positioned against outward end of the extender 110. The tying together of the telescoping tube assembly 118, with the end piece 113, in combination with the extender 110 being locked to the main body 2, in combination with the indicating device assembly 41 placed midway on the tubes 124, causes the present invention to be extremely stable against relative sideways torque. The resulting extended present invention, takes on the characteristics of a trussed device because of the multiplicity of supporting contact points between the telescoping tubes 124, the end piece 113, and the main body 2. Because of the effectiveness of the locking devices, 121 or 122, the level will not collapse when stood on end when in use.

CONCLUSION, RAMIFICATIONS, AND SCOPE

While the rods, shafts, and tubes are shown as being circular in cross section in the drawings, they can be made in any shape, such that the cross section would be rectangular, oval, trapezoidal, or any other shape that will allow them to perform in the intended manner.

Although the plate level, and the method of using the same according to the present invention, has been described in the specifications with considerable detail, it is to be understood that modifications may be made to the invention which do not exceed the scope of the appended claims. Also, while the above description contains many detailed specifics and examples, these should not be construed as limitations on the scope of any embodiment, but as exemplifications of the presently preferred embodiments thereof. Many other ramifications and variations are possible within the teachings of the various embodiments. Modified forms of the present invention done by others skilled in the art to which the invention pertains will be considered infringements of this invention when those modified forms fall within the claimed scope of this invention. Thus the scope of the invention should be determined by the appended claims and their legal equivalents, and not by the examples given.

What I claim as my invention is:

1. An extendible level device extendible between a closed position and a fully open position so that said extendible level device has a first length in said closed position and a longer length in said fully open position comprising:
   one body member,
   said body member having a first end and a second end,
   said body member having a top and bottom surface,
   said body member having two shafts,
   said two shafts extending into said first end of said body member,
   said two shafts extending completely through said body,
   said body member and said two shafts are linear in cross-section,
   a first end piece,
   level means attached to said body member,
   means attached to said first end piece and engaged with said two shafts for slidably attaching said first end piece to said first end of said body member,
   said means for slidably attaching said first end piece to said first end of said body member is two multi-section telescopic tube assemblies,
   one end of each of said two multi-section telescopic tube assemblies being attached to said first end piece, and the other end of each of said two multi-section telescopic tube assemblies being inserted into each of said two shafts in said first end of said body member,
   said two multi-section telescopic tube assemblies being parallel and in the same plane,
   whereby, the effective length of said extendible level device may be varied between said closed position and said fully open position,
   whereby locking devices cooperate with said body member and said two telescopic tube assemblies, so as to cause said body member and said two telescopic tube assemblies to be secure in a longitudinal direction as well as transverse direction, in any position of the extendible level device between said closed position and said fully open position.

2. The extendible level device as claimed in claim 1, wherein said two telescopic tube assemblies have an indicator device assembly attached between them thereto.

3. The extendible level device as claimed in claim 1 whereby said indicator device assembly is positioned for optimum viewing of said indicator device assembly.

4. The extendible level device as claimed in claim 1 whereby said indicator device assembly is positioned for stabilizing said two multi-section telescopic tube assemblies of the extendible level device.

\* \* \* \* \*